(12) United States Patent
Ogawa

(10) Patent No.: US 11,364,556 B2
(45) Date of Patent: Jun. 21, 2022

(54) ROTARY TOOL

(71) Applicant: KYOCERA Corporation, Kyoto (JP)

(72) Inventor: Hiroshi Ogawa, Omihachiman (JP)

(73) Assignee: KYOCERA CORPORATION, Kyoto (JP)

( * ) Notice: Subject to any disclaimer, the term of this patent is extended or adjusted under 35 U.S.C. 154(b) by 50 days.

(21) Appl. No.: 16/766,605

(22) PCT Filed: Nov. 21, 2018

(86) PCT No.: PCT/JP2018/042976
§ 371 (c)(1),
(2) Date: May 22, 2020

(87) PCT Pub. No.: WO2019/107243
PCT Pub. Date: Jun. 6, 2019

(65) Prior Publication Data
US 2020/0384552 A1 Dec. 10, 2020

(30) Foreign Application Priority Data
Nov. 29, 2017 (JP) .............................. JP2017-229145

(51) Int. Cl.
*B23B 51/00* (2006.01)
*B23B 51/02* (2006.01)

(52) U.S. Cl.
CPC ............ *B23B 51/02* (2013.01); *B23B 51/009* (2013.01); *B23B 2251/122* (2013.01); *B23B 2251/241* (2013.01); *B23B 2251/408* (2013.01)

(58) Field of Classification Search
CPC ..... B23B 51/009; B23B 51/10; B23B 51/105; B23B 51/101; B23B 51/02; B23B 51/0081; B23B 2251/40; B23B 2251/408; B23B 2251/54; B23B 2251/242; B23B 2251/241; B23B 2251/122; B23B 2251/48; B23B 2251/085; Y10T 408/905; Y10T 408/906; Y10T 408/909
See application file for complete search history.

(56) References Cited

U.S. PATENT DOCUMENTS 9,409,239 B2 * 8/2016 Higashiwaki ......... B23B 51/009
2013/0108381 A1   5/2013 Gey et al.
(Continued)

FOREIGN PATENT DOCUMENTS

DE 10 2011 117 148 A1 5/2013
FR       2552694 A1 4/1985
JP    2007-007831 A 1/2007

*Primary Examiner* — Chwen-Wei Su
(74) *Attorney, Agent, or Firm* — Volpe Koenig

(57) ABSTRACT

A rotary tool may include a body having a first part, a second part, a third part, a first cutting edge located at a first end, a flute extending from the first cutting edge toward a second end, and an outer peripheral surface. The outer peripheral surface in the third part may have a first portion. The third part may have a land face, and a second cutting edge located on a ridge line where a first portion and the land face intersect. The land face may have a first region in which a width increases from a side of the first end toward a side of the second end, and a second region that is located closer to the second end than the first region in which a width decreases from a side of the first end toward the second end.

9 Claims, 17 Drawing Sheets

(56) References Cited

U.S. PATENT DOCUMENTS

2013/0136552 A1* 5/2013 Ono ................ B23B 35/00
  408/1 R
2015/0093205 A1* 4/2015 Krenzer ............ B23B 51/009
  408/1 R

* cited by examiner

ROTARY TOOL

CROSS-REFERENCE TO RELATED APPLICATIONS

This application is a national stage entry according to 35 U.S.C. 371 of PCT Application No. PCT/JP2018/042976, filed on Nov. 21, 2018, which claims priority to Japanese Application No. 2017-229145, filed on Nov. 29, 2017, which is entirely incorporated herein by reference.

TECHNICAL FIELD

The present aspect relates to a rotary tool.

BACKGROUND ART

As a rotary tool for drilling a workpiece, for example, a drill is discussed in JP 2007-7831 A (Patent Document 1). The drill disclosed in Patent Document 1 may include a small diameter portion located on a side of a tip, a front end cutting edge located at a tip of the small diameter portion, a large diameter portion located on a side of a rear end, a step portion located between the small diameter portion and the large diameter portion in which a diameter dimension continuously increases from a side of a tip toward a side of a rear end, and a step portion cutting edge located in the step portion.

In the drill discussed in Patent Document 1, the step portion cutting edge is inclined by a range of 10° to 25°. This may improve sharpness and durability. However, in recent years, there has been a demand for further improvement in the sharpness and durability.

SUMMARY OF INVENTION

A rotary tool according to a non-limiting aspect may include a body in a rod shape extending along a rotational axis from a first end toward a second end. The body may include a first part, a second part, a third part, a first cutting edge, a flute, and an outer peripheral surface. The first part may include the first end and may have a first outer diameter. The second part may be located closer to the second end than the first part and may have a second outer diameter larger than the first outer diameter. The third part may be located between the first part and the second part and may have a third outer diameter that increases from a side of the first part toward a side of the second part. The first cutting edge may be located at the first end. The flute may extend from the first cutting edge toward the second end, and may be located at the first part, the third part, and the second part. The outer peripheral surface may be located along the flute at the first part, the third part, and the second part. Further, the outer peripheral surface may be located rearward the flute in a rotational direction of the rotational axis. In addition, the outer peripheral surface in the third part may include a first portion. The third part may include a land face and a second cutting edge. The land face may be located between the flute and the first portion. The second cutting edge may be located on a ridge line where the first portion and the land face intersect. The land face may include a first region and a second region. A width of the first region in a direction orthogonal to the ridge line may increase from a side of the first end toward a side of the second end. The second region may be located closer to the second end than the first region, and a width in the direction orthogonal to the ridge line may decrease from a side of the first end toward a side of the second end.

DESCRIPTION OF EMBODIMENTS

A rotary tool according to a non-limiting embodiment will be described below in detail with reference to the drawings. However, for convenience of description, each of the drawings referenced below may be simplified to illustrate only main members among constituent members of the non-limiting embodiment. Accordingly, the rotary tool may be provided with any constituent member that is not illustrated in each of the drawings referenced in this specification. Further, the dimensions of the members in each of the drawings do not faithfully represent the actual dimensions of the constituent members and the dimension ratios of each of the members.

FIG. 1 to FIG. 14 may illustrate a stepped drill with two steps as a non-limiting example of a rotary tool 1. Note that, the rotary tool 1 according to the embodiment is not limited to a stepped drill with two steps, and may be, for example, one of a drilling drill, an end mill, and a reamer with three or more steps.

Figure 1:
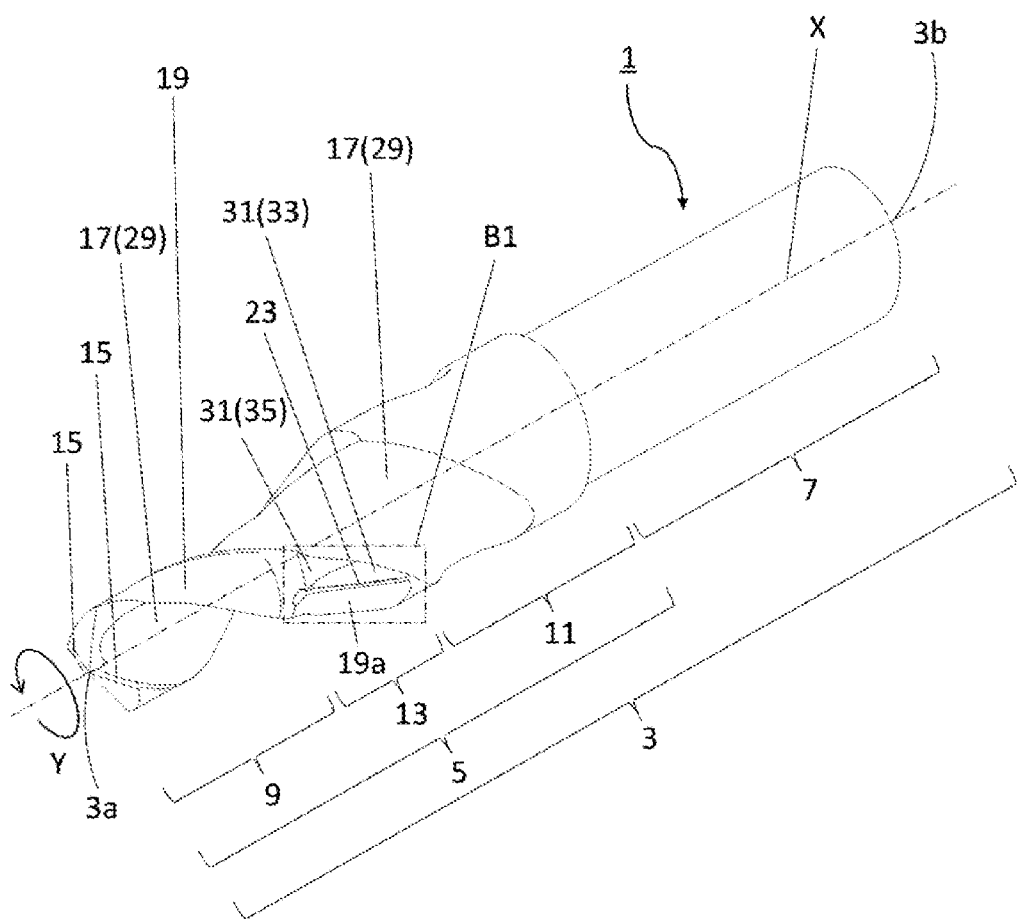
FIG. 1 is a perspective view illustrating a rotary tool of a non-limiting embodiment.
Figure 2:
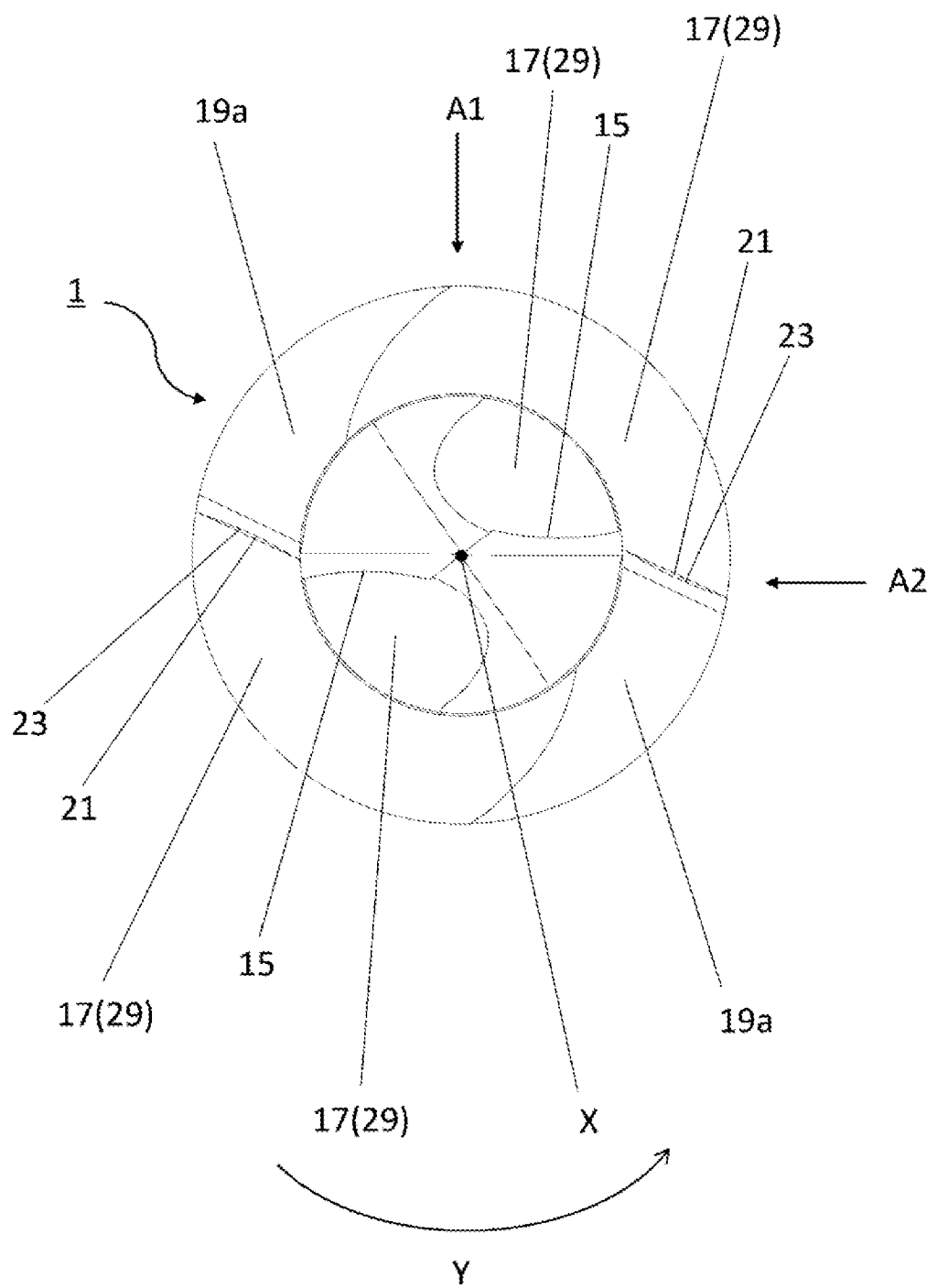
FIG. 2 is a diagram of the rotary tool illustrated in FIG. 1 when viewed from a tip.

As illustrated in FIG. 1, a body 3 in the rotary tool 1 according to the non-limiting embodiment may be rod-shaped extending from a first end 3a toward a second end 3b along a rotational axis X. The rod-shaped body 3 may rotate around the rotational axis X in a direction of an arrow Y as illustrated in FIG. 1, when a workpiece is machined to manufacture a machined product.

Figure 3:
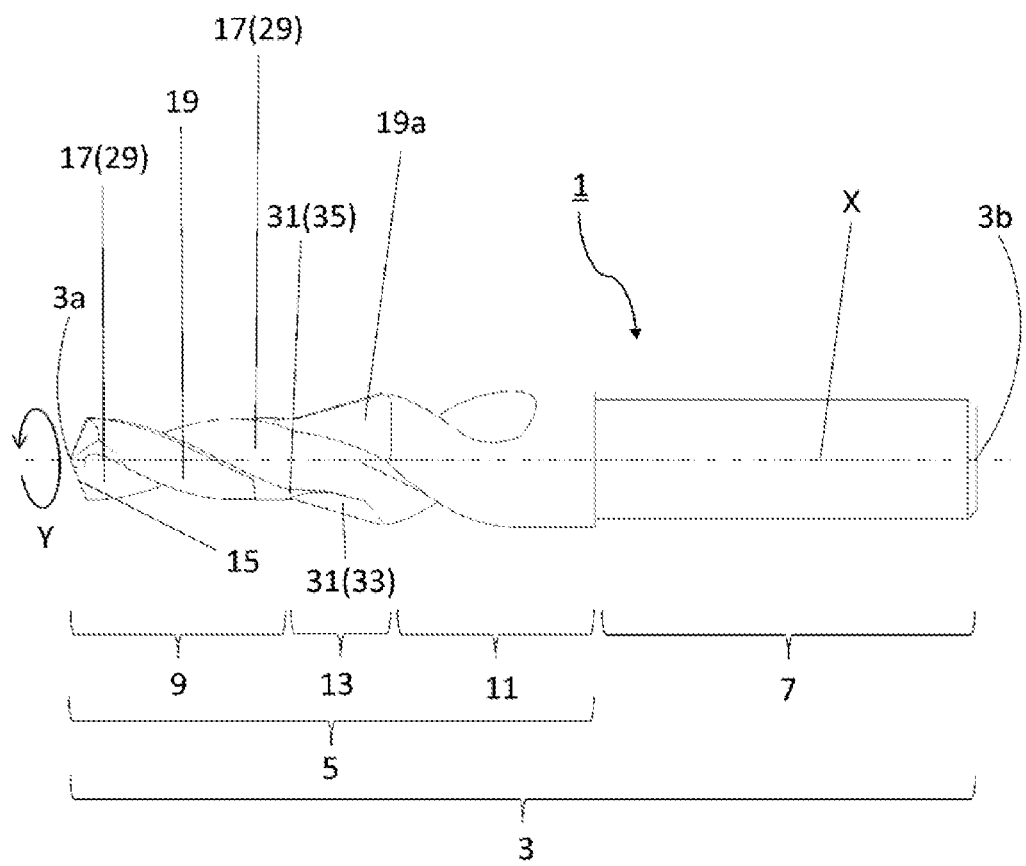
FIG. 3 is a side view as viewed from an A1 direction illustrated in FIG. 2.
Figure 4:
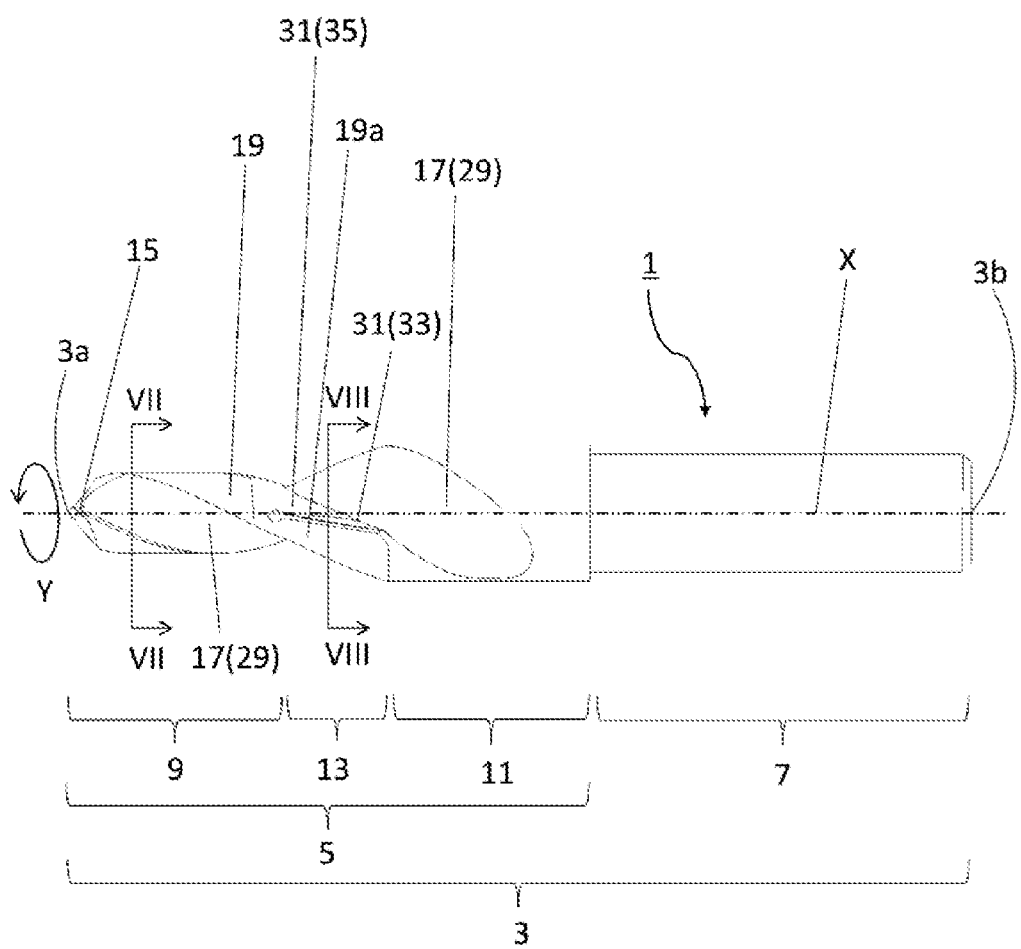
FIG. 4 is a side view as viewed from an A2 direction illustrated in FIG. 2.

In FIG. 3 and FIG. 4, a left end portion of the body 3 may be the first end 3a, and a right end portion of the body 3 may be the second end 3b. Hereinafter, the first end 3a may be referred to as the tip 3a, and the second end 3b may be referred to as the rear end 3b to reflect the usage condition of the rotary tool 1 during machining.

The body 3 may include a cutting section 5 and a shank section 7. The shank section 7 may be a part gripped by a rotating spindle of a machine tool, and designed in accordance with a shape of the spindle in the machine tool. Examples of a shape of the shank section 7 may include a straight shank, a long shank, a long neck, a tapered shank, and the like.

The cutting section 5 may be located on the tip 3a side with respect to the shank section 7. The cutting section 5 may include a part that comes into contact with the workpiece, and the part may play a key role in machining the workpiece.

As in the non-limiting example illustrated in FIG. 1, FIG. 3, and FIG. 4, the rod-shaped body 3 may include a first part 9, a second part 11, and a third part 13. The first part 9 may include the tip 3a. The second part 11 may be located closer to a side of the rear end 3b than the first part 9, and an outer diameter thereof may be larger than that of the first part 9. The third part 13 may include a portion that is located between the first part 9 and the second part 11, in which an outer diameter increases from a side of the first part 9 toward a side of the second part 11.

As in the non-limiting example illustrated in FIG. 1, FIG. 3, and FIG. 4, the rotary tool 1 according to the non-limiting embodiment may include a first cutting edge 15 and a flute 17. The first cutting edge 15 may be located at the tip 3a of the body 3. The flute 17 may extend from the first cutting edge 15 toward the rear end 3b, and may be located at the first part 9, the third part 13, and the second part 11. The flute 17 in the non-limiting embodiment may be used to discharge chips produced primarily by the first cutting edge 15 to an outside.

In addition, the body 3 may include an outer peripheral surface 19 located along the flute 17 at the first part 9, the third part 13, and the second part 11. Additionally, the outer peripheral surface 19 may be located rearward the flute 17 in the rotational direction.

The body 3 may include one or more of the first cutting edges 15, one or more of the flutes 17, and one or more of the outer peripheral surfaces 19. The number of first cutting edges 15, the number of flutes 17, and the number of outer peripheral surfaces 19 may be equal. In the non-limiting example illustrated in FIG. 1 and the like, the body 3 may include two of the first cutting edges 15, two of the flutes 17, and two of the outer peripheral surfaces 19.

Also, as illustrated in FIG. 1 and the like, an outer peripheral blade may be provided on a ridge line formed by the flute 17 and the outer peripheral surface 19. The body 3 need not include an outer peripheral blade, but in the non-limiting example illustrated in FIG. 1 and the like, the body 3 may include an outer peripheral blade. Also, the outer peripheral blade may be located on an entirety of the ridge line formed by the flute 17 and the outer peripheral surface 19, or the outer peripheral blade may be partially provided.

A portion of the flute 17 in a vicinity of the first cutting edge 15 may function as a rake surface during cut processing. Also, the flute 17 may spirally extend, as in the non-limiting example illustrated in FIG. 1, from the first cutting edge 15 toward the rear end 3b. In addition, when the flute 17 spirally extends, a helix angle of the flute 17 may change from the first cutting edge 15 toward the rear end 3b, but may be constant.

Figure 5:
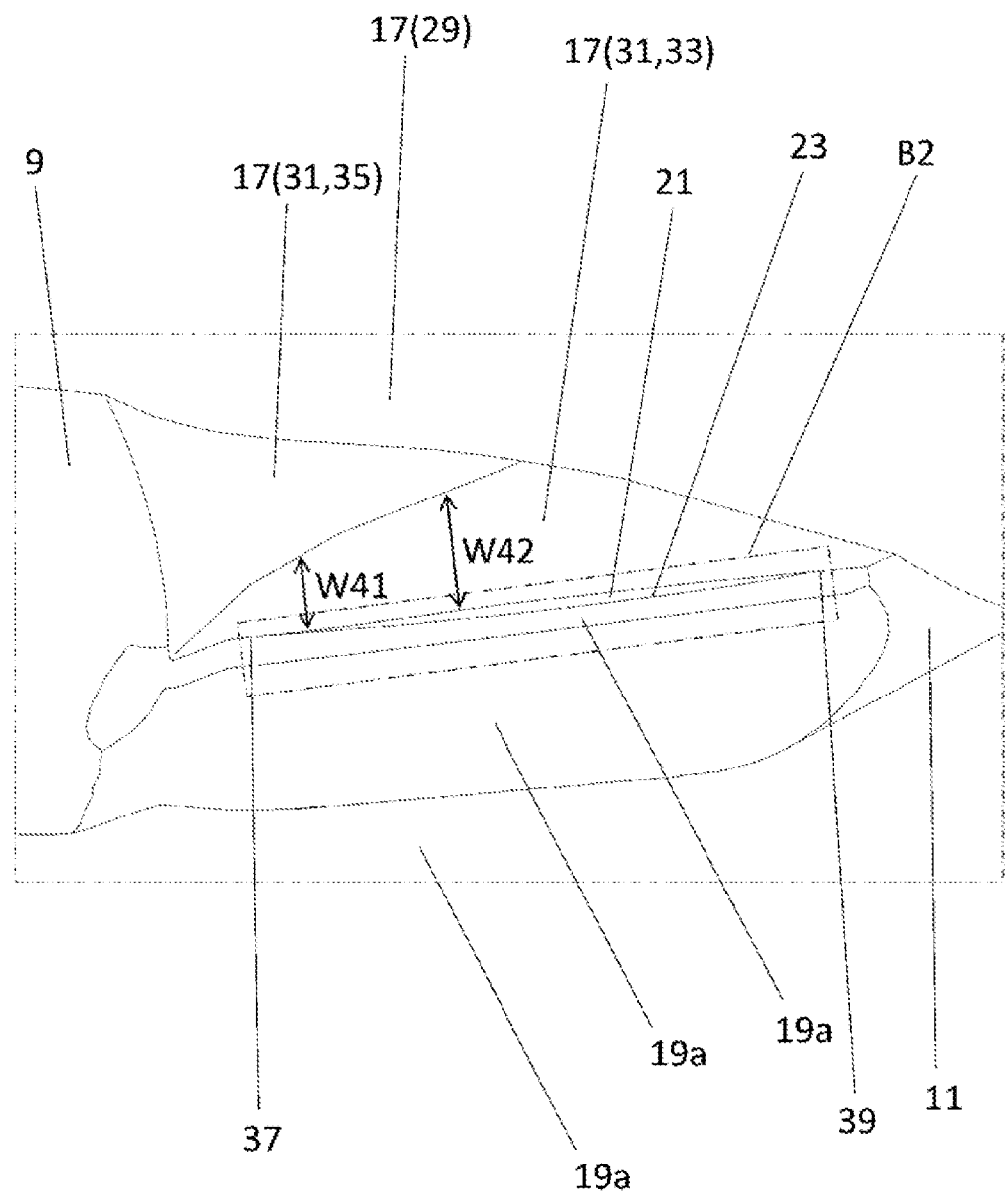
FIG. 5 is an enlarged view of a region B1 in FIG. 1.

FIG. 5 may be an enlarged view of the region B1 in FIG. 1 and can also be referred to as an enlarged view of the third part 13. Further, FIG. 6 may be an enlarged view of the region B2 in FIG. 5. Note that, FIG. 6 may be a drawing drawn using scale different from actual scale to emphasize change in width in a direction orthogonal to a ridge line formed by the flute 17 and a land face 21 in the region B2.

Figure 6:
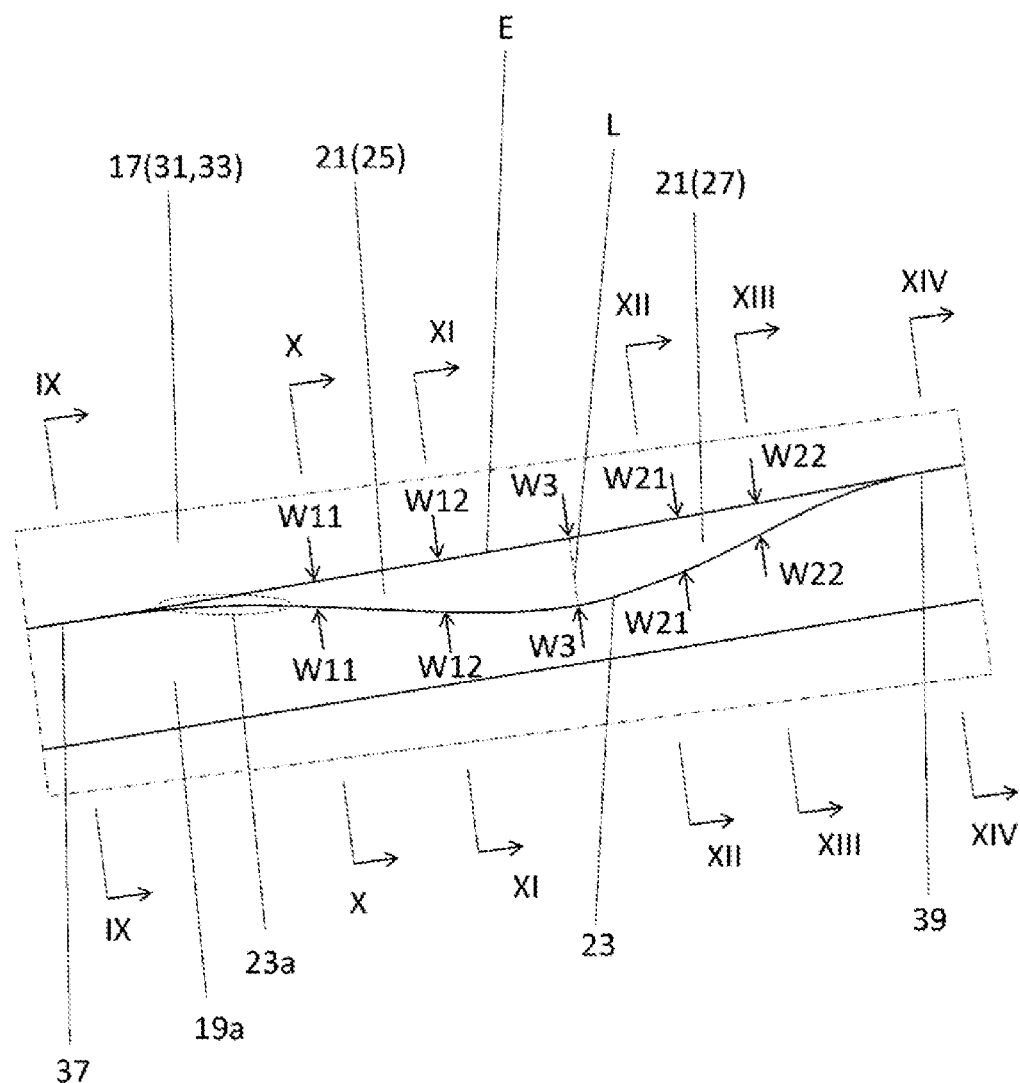
FIG. 6 is an enlarged view of a region B2 in FIG. 5.
Figure 7:
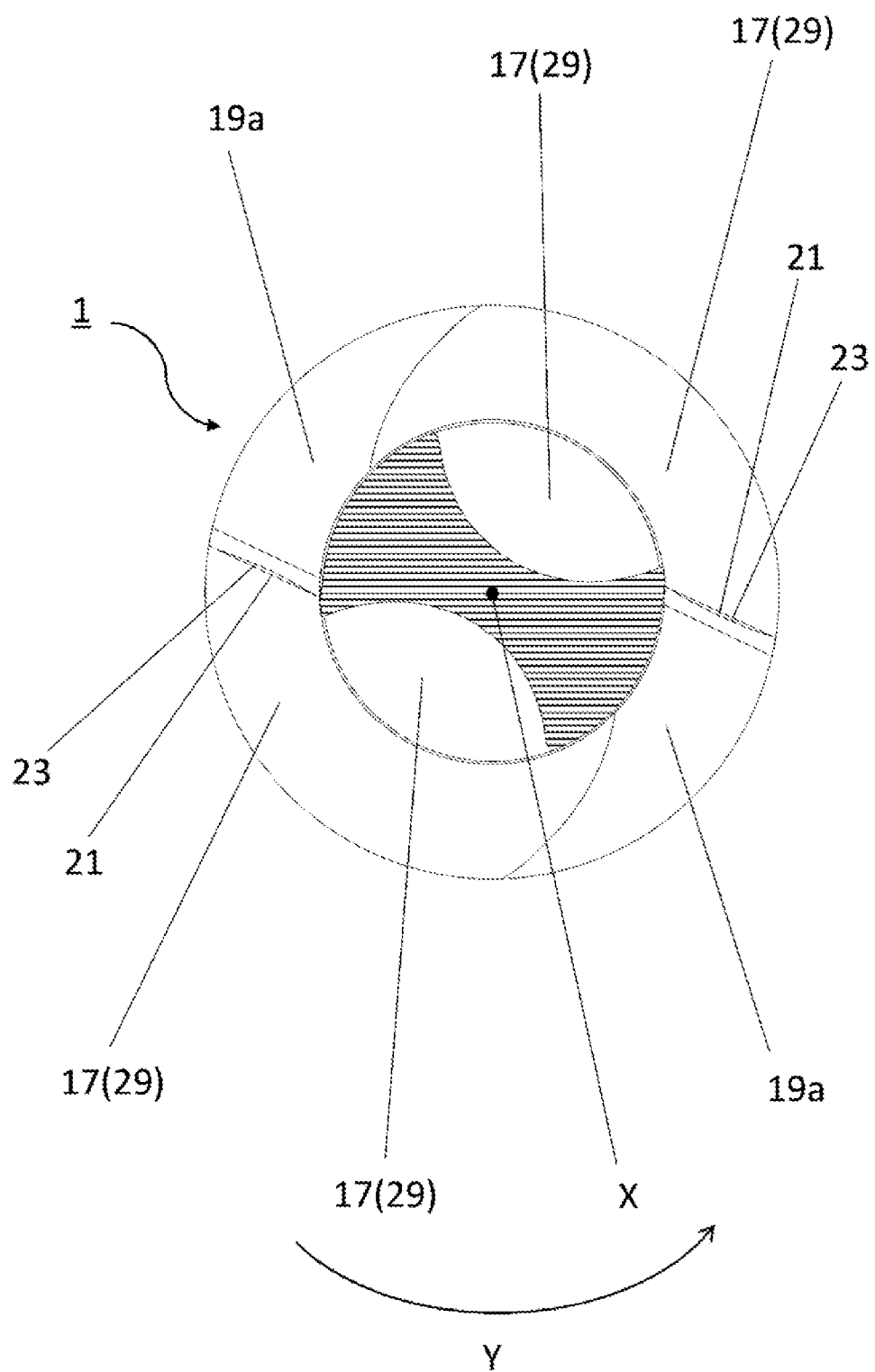
FIG. 7 is a cross-sectional view illustrating a VII-VII cross section in FIG. 4.

As in the non-limiting example illustrated in FIG. 5 and FIG. 6, the outer peripheral surface 19 in the third part 13 may include a first portion 19a. Further, the third part 13 may include the land face 21 located between the flute 17 and the first portion 19a, and a second cutting edge 23 located on a ridge line where the first portion 19a and the land face 21 intersect. A portion of the flute 17 in a vicinity of the second cutting edge 23 may function as a rake surface during cut processing.

In the non-limiting example illustrated in FIG. 6, the land face 21 may include a first region 25 in which a width in a direction orthogonal to a ridge line E (hereinafter may simply be referred to as the ridge line E) formed by the flute 17 and the land face 21 increases from a side of the tip 3a toward a side of the rear end 3b (in the figure, from left to right), and a second region 27 located closer to a side of the rear end 3b than the first region 25 in which a width in the direction orthogonal to the ridge line E decreases from a side of the tip 3a toward a side of the rear end 3b.

Specifically, as in the non-limiting example illustrated in FIG. 6, a width W12 in the land face 21 located on a side of the rear end 3b of the first region 25 may be larger than a width W11 in the land face 21 located on a side of the tip 3a of the first region 25.

Also, a width W3 at a boundary L between the first region 25 and the second region 27 may be largest among widths in the direction orthogonal to the ridge line E in the land face 21. Further, a width W22 in the land face 21 located on a side of the rear end 3b of the second region 27 may be larger than a width W21 in the land face 21 located on a side of the tip 3a of the second region 27.

In addition, in the non-limiting example illustrated in FIG. 6, X-X to XIII-XIII may each illustrate a cross section orthogonal to the ridge line E, and the cross sections X-X to XIII-XIII may correspond to FIG. 10 to FIG. 13, respectively. In FIG. 10 to FIG. 13, the land face 21 inclined with respect to the first portion 19a may be illustrated, but the cross sections illustrated in FIG. 10 to FIG. 13 are non-limiting examples and do not necessarily include an inclination angle described.

Note that, in the non-limiting example illustrated in FIG. 6, the first region 25 and the second region 27 may contact each other, but the first region 25 and the second region 27 need not contact each other. That is, a third region may be included between the first region 25 and the second region 27, in which a width in the direction orthogonal to the ridge line E is smaller than widths in the first region 25 and the second region 27.

The second cutting edge 23 located in the third part 13 with an outer diameter larger than that of the first part 9, may contact a part that is not cut by the first part 9 during cut processing. In the non-limiting example illustrated in FIG. 6, a part of the second cutting edge 23 closest to the first part 9 may be an end portion 23a. This end portion 23a in the second cutting edge 23 may contact a workpiece first. At this time, a width of a portion along the end portion 23a in the land face 21 may be relatively small. In this case, cutting performance of the second cutting edge 23 may be improved, and the second cutting edge 23 may be likely to bite the workpiece. As a result, the rotary tool 1 can perform cut processing at a stable processing position.

Note that, the above-described "end portion 23a" does not refer to one point of an end of the second cutting edge 23 on a side of the first part 9, and means a region adjacent to the first part 9. Specifically, a region of approximately 10% located on the side of the first part 9 in the second cutting edge 23 may be meant.

In addition, for example, during penetrating hole processing or countersink processing, burrs may be likely to be generated on a surface of the workpiece that contacts a vicinity of a boundary between the third part 13 and the second part 11. However, the rotary tool 1 in the non-limiting embodiment, can suppress generation of burrs. Because a width of the land face 21 may be small in the second region 27 in a vicinity of the second part 11, and thus cutting performance may be improved. In addition, a width may be large, on a side of the rear end 3b of the first region 25 and on a side of the tip 3a of the second region 27, that is, in a center portion of the land face 21. Accordingly, in the rotary tool 1 in the non-limiting embodiment, defect resistance of a main cutting portion of the second cutting edge 23 may be improved.

Additionally, the land face 21 may contact the first part 9 and the second part 11, but as in the non-limiting example illustrated in FIG. 5 and FIG. 6, the land face 21 may be separated from the first part 9 and the second part 11. In other words, land face 21 may be located from an end portion of the third part 13 on a side of the tip 3a to an end portion on a side of the rear end 3b, but as in the non-limiting example illustrated in FIG. 5 and FIG. 6, the land face 21 may be located so as not to reach the end of the third part 13 on the side of the end portion 3a and the end portion on the side of the rear end 3b.

When the rotary tool 1 in the non-limiting embodiment is configured as described above, a ridge line where the flute 17 and the first portion 19a intersect may include a third cutting edge 37 and a fourth cutting edge 39. As in the non-limiting example illustrated in FIG. 5 and FIG. 6, the ridge line where the flute 17 and the first portion 19a intersect may be connected to the second cutting edge 23.

Figure 9:
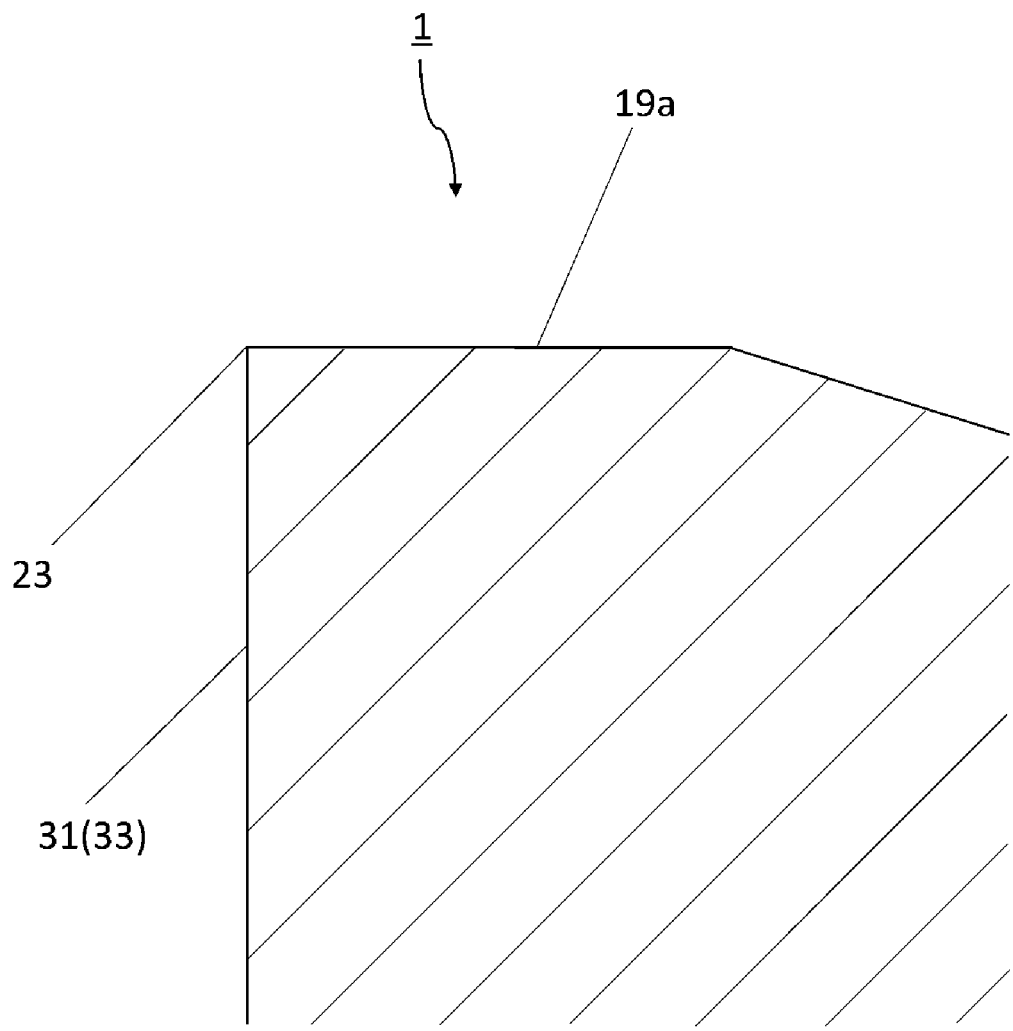
FIG. 9 is a cross-sectional view illustrating an IX-IX cross section in FIG. 6.
Figure 14:
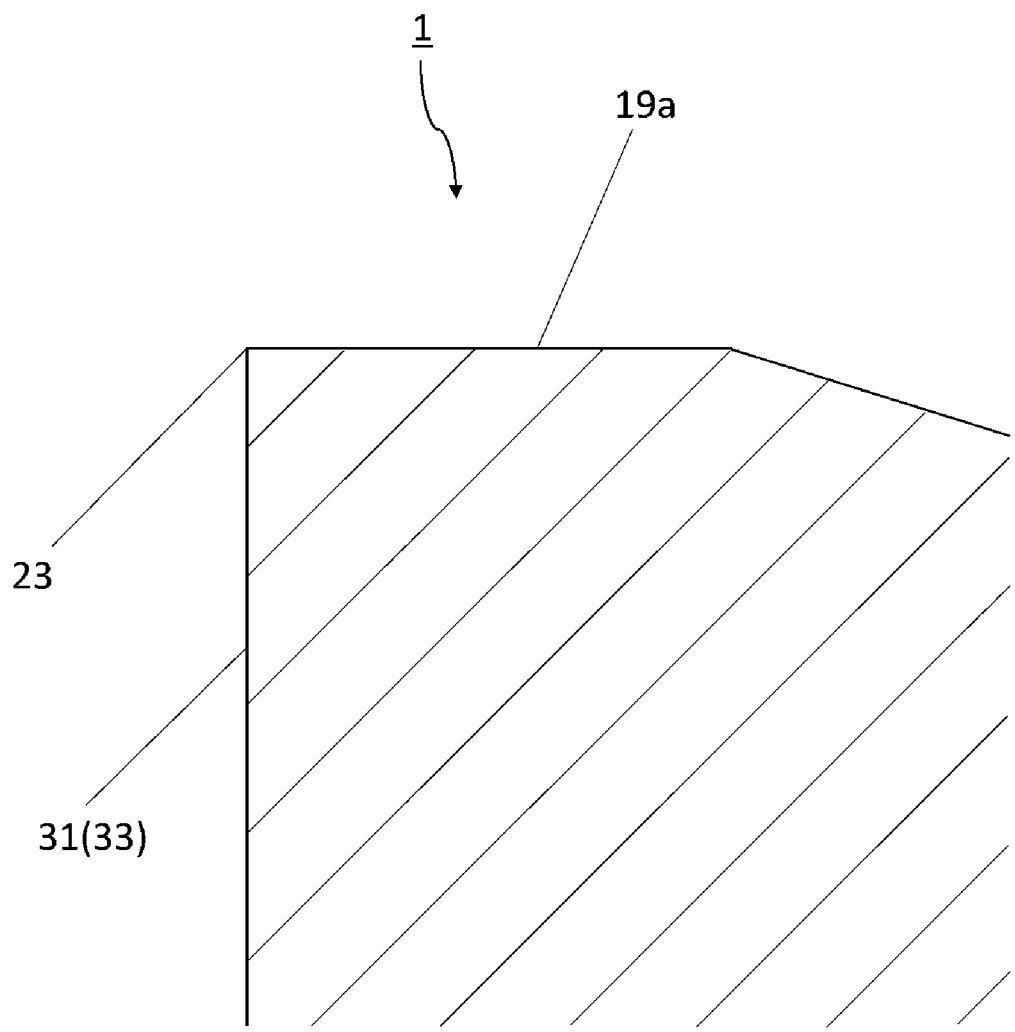
FIG. 14 is a cross-sectional view illustrating an XIV-XIV cross section in FIG. 6.

The cross section IX-IX and the cross section XIV-XIV in the non-limiting example illustrated in FIG. 6 may be each a cross section in a direction orthogonal to the ridge line formed by the flute 17 and the first portion 19a, when the land face 21 is separated from the first part 9 and the second part 11, and may be precisely illustrated in FIG. 9 and FIG. 14, respectively.

The third cutting edge 37 located in the third part 13 with an outer diameter larger than that of the first part 9, may first contact a portion that is not cut by the first part 9 during cut processing. According to the configuration illustrated in FIG. 6, the third cutting edge 37 may have high cutting performance and may be likely to bite a workpiece since the land face 21 is not located forward in the rotational direction.

In addition, for example, during penetrating hole processing or countersink processing, burrs may be likely to be generated on a surface of a workpiece that contacts a vicinity of the boundary between the third part 13 and the second part 11. According to the configuration illustrated in FIG. 6, the fourth cutting edge 39 may have high cutting performance and can suppress generation of burrs since the land face 21 is not located forward in the rotational direction.

In addition, the flute 17 in the non-limiting example illustrated in FIG. 1 and FIG. 5 may include a spiral-shaped main flute 29 located at the first part 9 to the second part 11, and a sub flute 31 located between the main flute 29 and the first portion 19a. In the third part 13, an outer diameter may increase from a side of the tip 3a toward a side of the rear end 3b, and thus a rotational speed in the second cutting edge 23 may increase. Accordingly, chips produced by the second cutting edge 23 during cut processing may be more likely to be longer than chips produced by the first cutting edge 15.

However, in the rotary tool 1 in the non-limiting embodiment, it may be possible to improve chip discharge performance. This is because, the flute 17 may include the sub flute 31 that is relatively smaller than the main flute 29, thus chips produced by the second cutting edge 23 can be favorably curled. The chips may be less likely to be long by being favorably curled. Thus, the chips may be less likely to clog.

Additionally, in the non-limiting example illustrated in FIG. 5, the sub flute 31 may also include a first surface 33 and a second surface 35. The first surface 33 may also be located along the ridge line formed by the flute 17 and the land face 21. Further, the second surface 35 may also be located forward the first surface 33 in the rotational direction, and adjacent to the first surface 33. Furthermore, in the non-limiting example in FIG. 5 and FIG. 8, the second surface 35 may be a convex curved shape.

Figure 8:
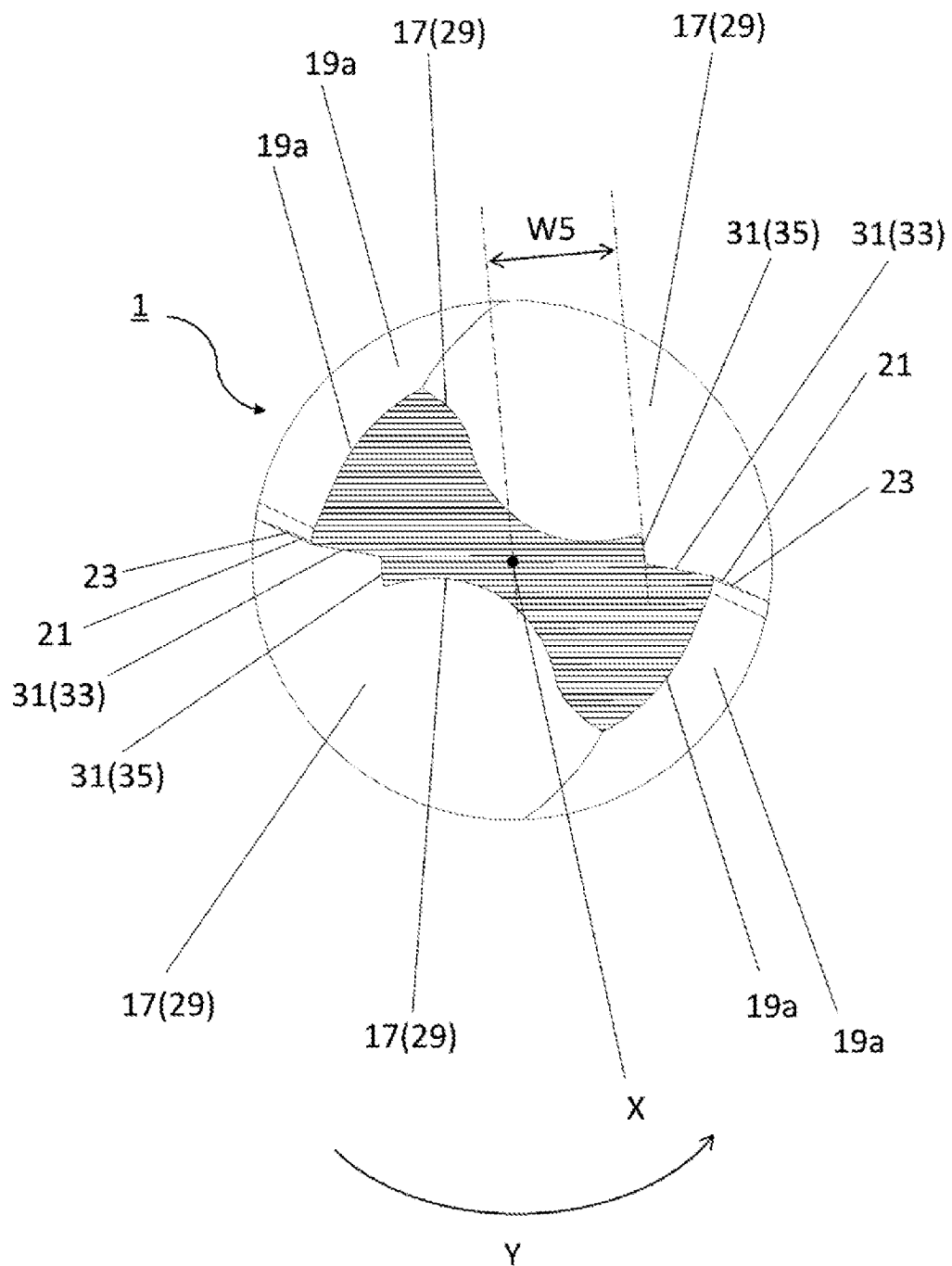
FIG. 8 is a cross-sectional view illustrating a VIII-VIII cross section in FIG. 4.

As illustrated in FIG. 8, in a cross section orthogonal to the rotational axis X of the third part 13, the second surface 35 may be a convex curved shape. When the second face 35 is a convex curved shape, the rotary tool 1 may have excellent durability since a vicinity of a boundary between the first part 9 and the third part 13 is thick.

Further, the second surface 35 may include a portion in which a distance from the rotational axis X decreases from the tip 3a toward the rear end 3b. In other words, the second surface 35 may include a portion in which a distance from the rotational axis X increases from the rear end 3b toward the tip 3a.

Specifically, as in the non-limiting example illustrated in FIG. 8, the second surface 35 may include a portion in which a size of a distance W5 from the rotational axis X to the second surface 35 decreases from the tip 3a toward the rear end 3b. In other words, the second surface 35 in the non-limiting example illustrated in FIG. 8 may include a portion in which the size of the distance W5 from the rotational axis X to the second surface 35 increases from the rear end 3b toward the tip 3a.

During cut processing, chips produced by the second cutting edge 23 may be likely to travel in a direction orthogonal to the second cutting edge 23, and may be likely to flow substantially vertically into the main flute 29. Accordingly, the chips produced by the second cutting edge 23 may be likely to merge substantially vertically with chips produced by the first cutting edge 15 and flowing through the main flute 29. Accordingly, the chips produced by the first cutting edge 15 and the chips produced by the second cutting edge 23 may be likely to be entangled with each other, and there is a possibility that chip clogging occurs.

However, with the configuration described above, a distance from the rotational axis X to the second surface 35 in a vicinity of a boundary between the third part 13 and the first part 9 in the second surface 35, may be large. Accordingly, the chips produced by the second cutting edge 23 may be less likely to merge substantially vertically with the chips flowing through the main flutes 29.

In addition, when the distance from the rotational axis X to the second surface 35 decreases from the tip 3a toward the rear end 3b, the second surface 35, while favorably curling chips produced by the second cutting edge 23, can merge chips produced by the second cutting edge 23 into the main flute 29 at a relatively gentle angle. As a result, the chips produced by the first cutting edge 15 and the chips produced by the second cutting edge 23 may be less likely to be entangled with each other, and chip clogging may be suppressed. Thus, the rotary tool 1 in the non-limiting embodiment may have favorable chip discharge performance.

In addition, in the non-limiting example in FIG. 5 and FIG. 8, the first surface 33 may be a flat shape. As illustrated in FIG. 8, in a cross section orthogonal to the rotational axis X of the third part 13, the first surface 33 may be linear. Since the first surface 33 is a flat shape, a chip discharge space in the second surface 35 may be ensured, and the rotary tool 1 may have favorable chip discharge performance.

In addition, in the non-limiting example illustrated in FIG. 5, the first surface 33 may include a portion in which a width increases from the tip 3a toward the rear end 3b. Specifically, as in the non-limiting example illustrated in FIG. 5, a width W42 in the direction orthogonal to the ridge line formed by the flute 17 and the land face 21 on a side of the rear end 3b in the first surface 33 may be larger than a width W41 in the direction orthogonal to the ridge line formed by the flute 17 and the land face 21 on a side of the tip 3a in the first surface 33. When the above-described configuration is satisfied, the chip discharge space in the first surface 33 may be ensured, and the rotary tool 1 may have favorable chip discharge performance.

In addition, in the non-limiting example illustrated in FIG. 6, the cross section X-X to the cross section XIII-XIII may be cross sections in the direction orthogonal to the ridge line E, and as in the non-limiting example illustrated in FIG. 10 to FIG. 13, the land face 21 may be inclined with respect to the first portion 19a.

Figure 10:
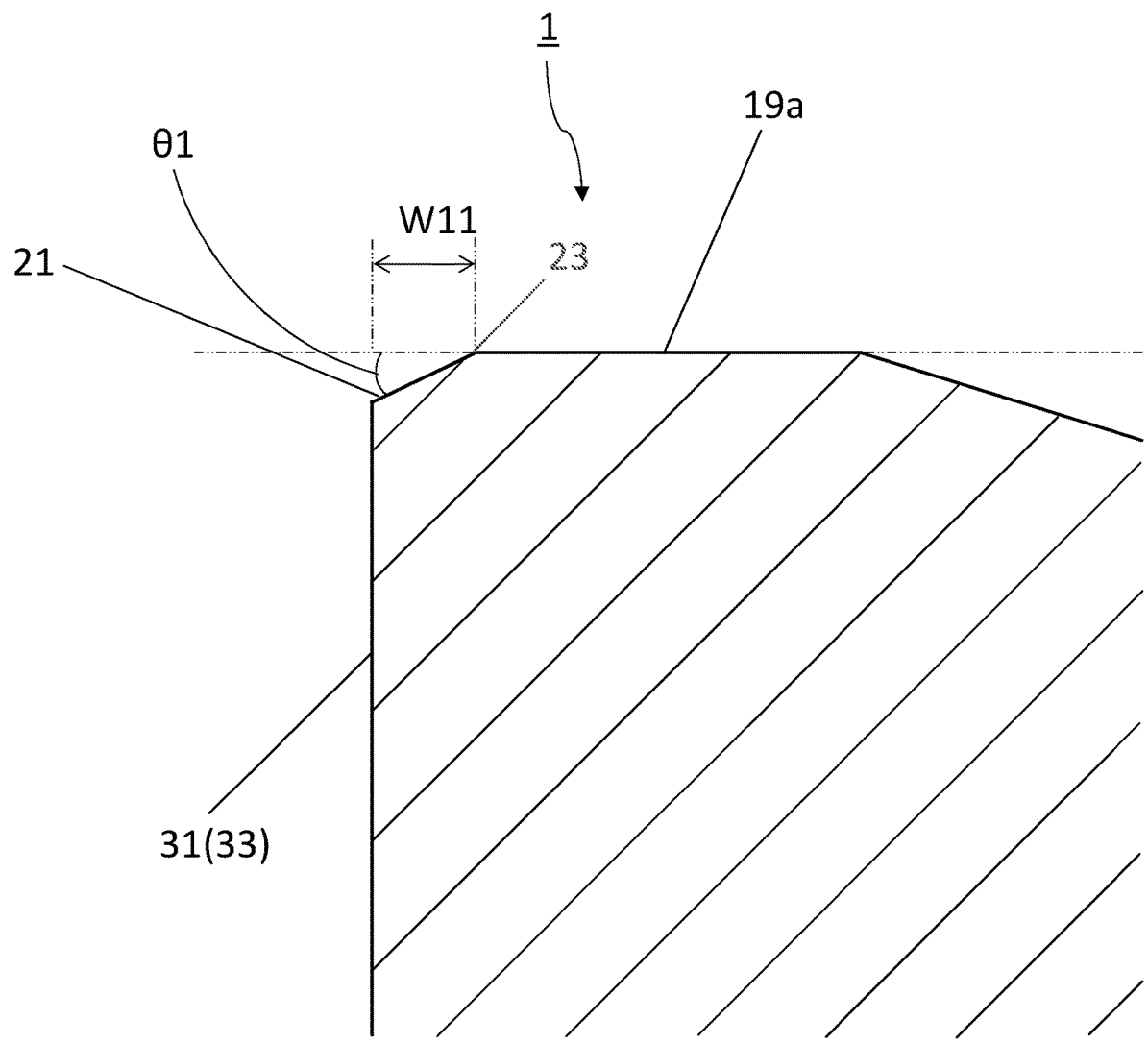
FIG. 10 is a cross-sectional view illustrating an X-X cross section in FIG. 6.
Figure 11:
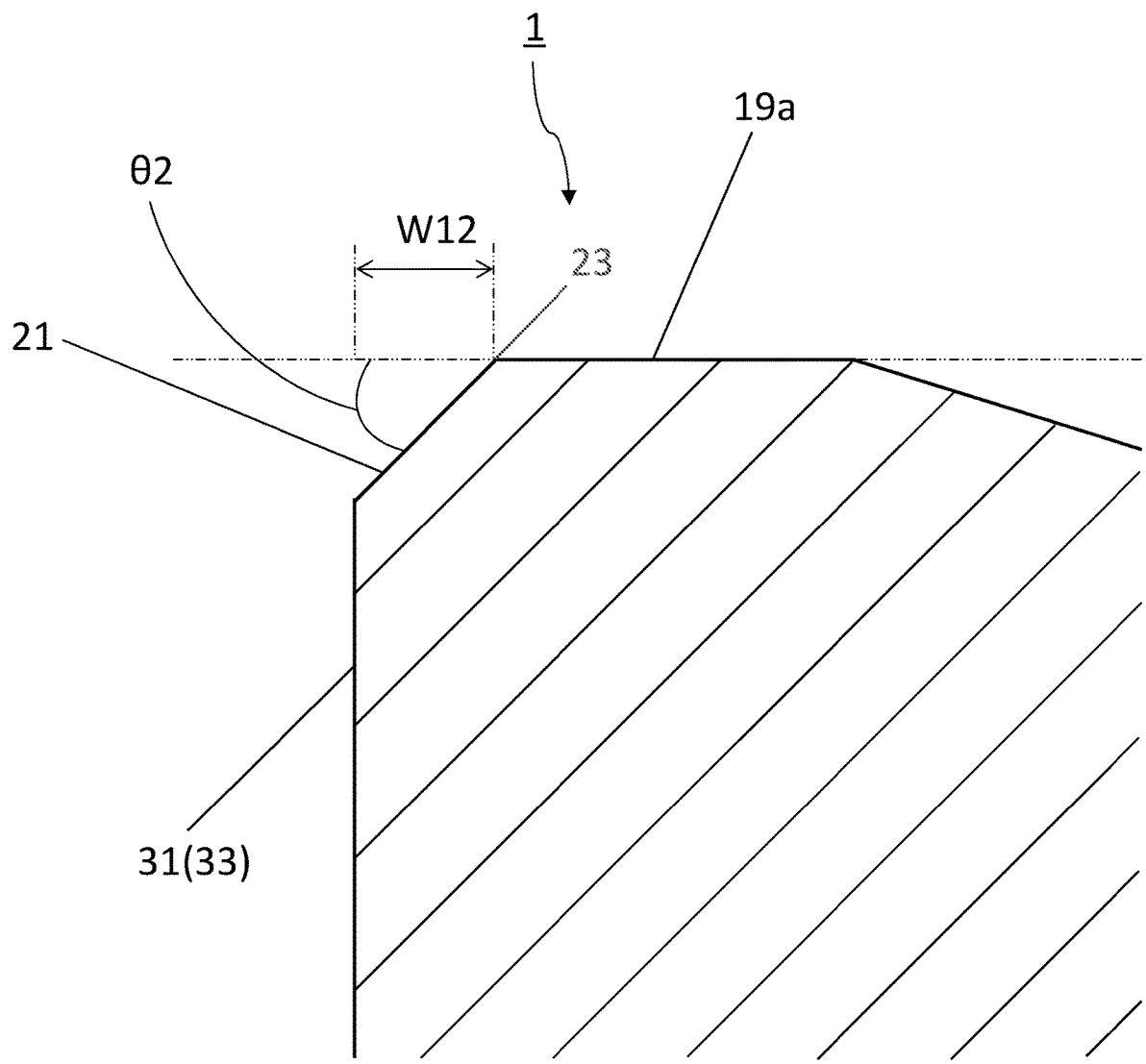
FIG. 11 is a cross-sectional view illustrating an XI-XI cross section in FIG. 6.

As in the non-limiting example illustrated in FIG. 10 and FIG. 11, an inclination angle θ1 in the land face 21 located on a side of the tip 3a in the first region 25 may also be smaller than an inclination angle θ2 in the land face 21 located on a side of the rear end 3b in the first region 25. Also, an inclination angle of the first region 25 with respect to the first portion 19a may decrease from an end portion on a side of the rear end 3b toward an end portion on a side of the tip 3a in the first region 25.

The second cutting edge 23 located in the third part 13 with an outer diameter larger than that of the first part 9, may contact a part that is not cut by the first part 9 during cut processing. The first region 25, of the second cutting edge 23, in a vicinity of the first part 9 may contact a workpiece first. When cutting performance of the first region 25 in the vicinity of the first part 9 is high, the first region 25 in the vicinity of the first part 9 may be likely to bite the workpiece. The rotary tool 1 in the non-limiting embodiment may have high cutting performance since an inclination angle in the land face 21 is small. Thus, since the rotary tool 1 in the non-limiting embodiment is likely to bite a workpiece, cut processing can be performed at a stable processing position.

Figure 12:
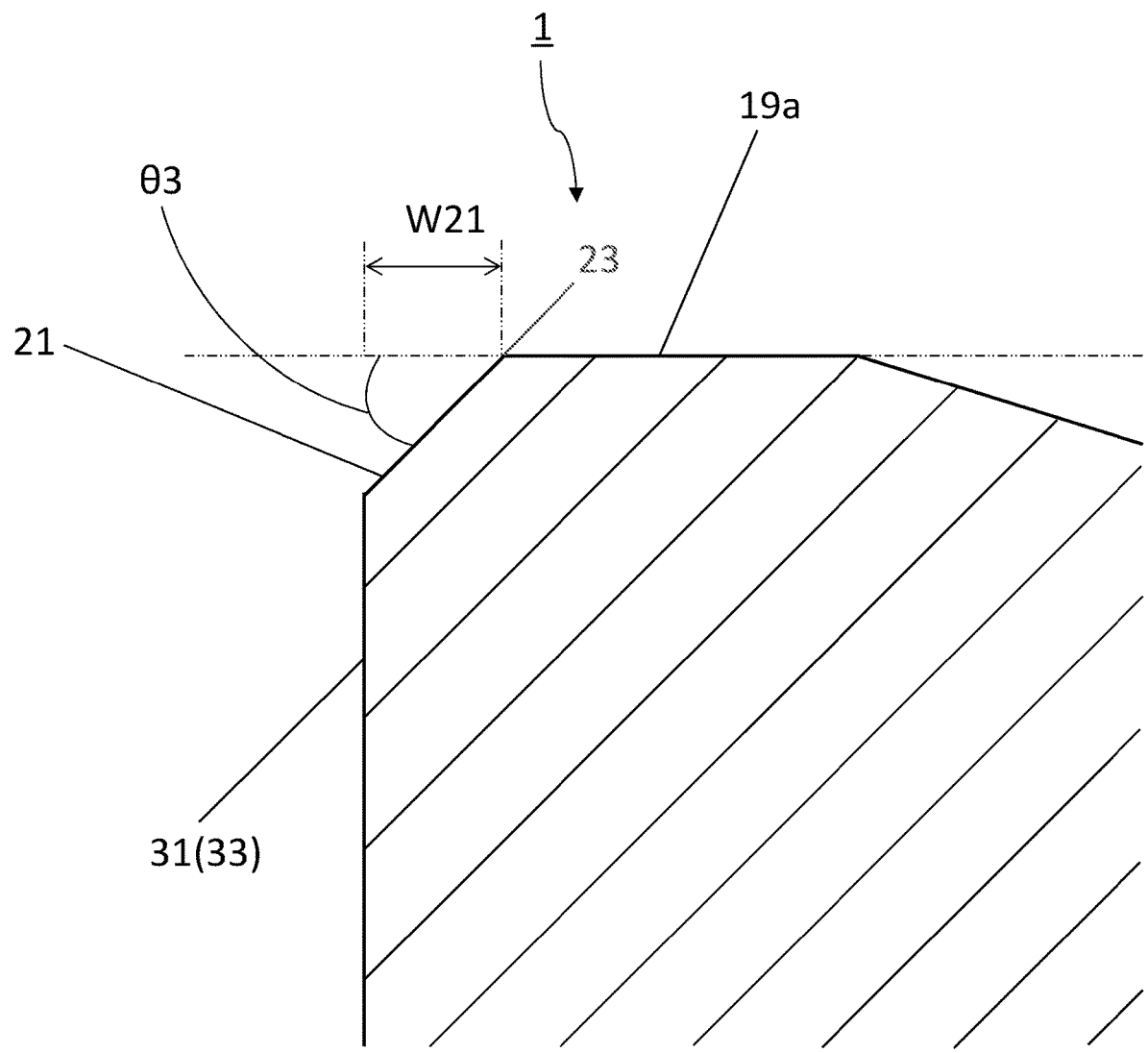
FIG. 12 is a cross-sectional view illustrating an XII-XII cross section in FIG. 6.
Figure 13:
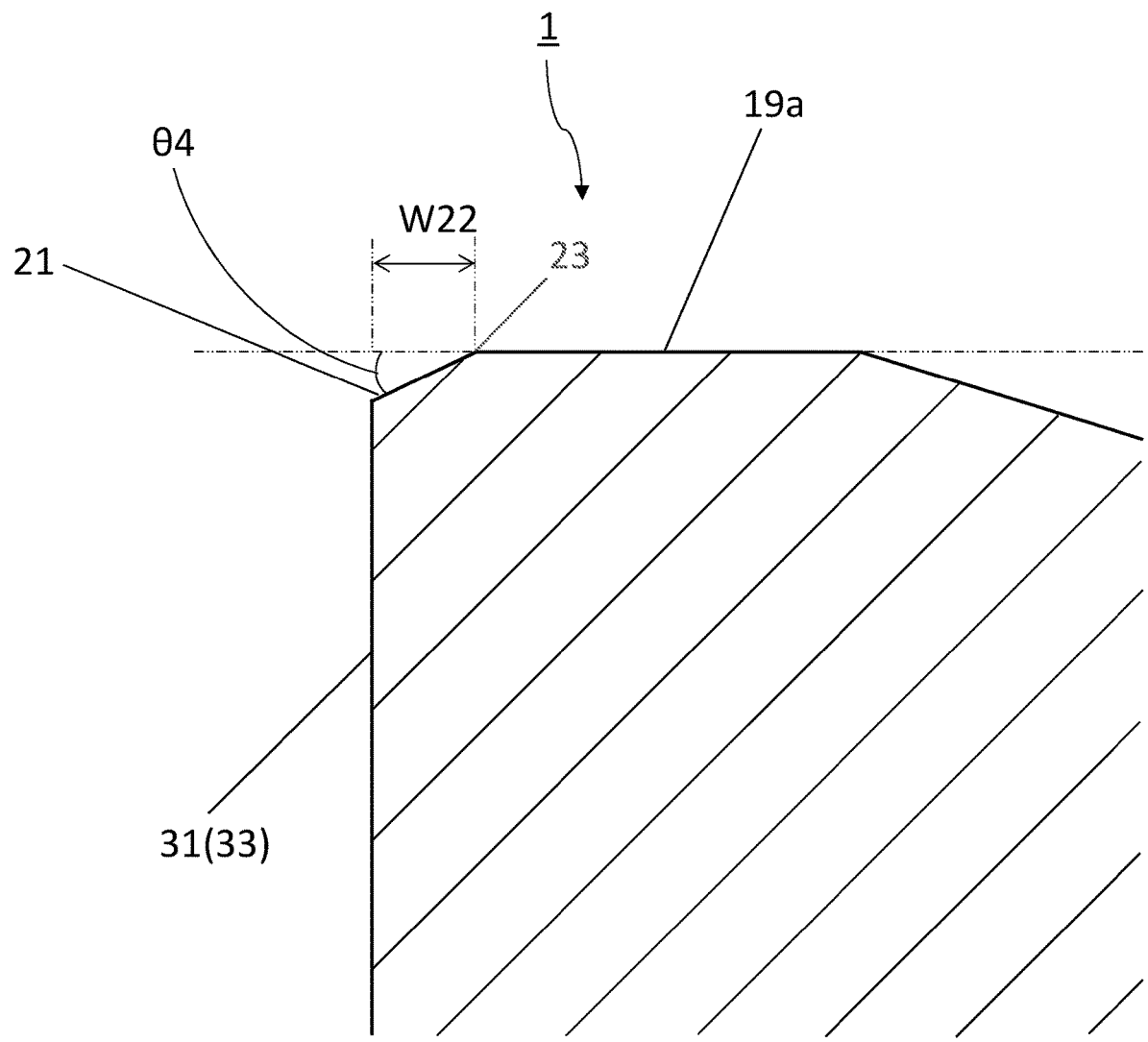
FIG. 13 is a cross-sectional view illustrating an XIII-XIII cross section in FIG. 6.

Further, as in the non-limiting example illustrated in FIG. 12 and FIG. 13, an inclination angle θ4 in the land face 21 located on a side of the rear end 3b in the second region 27 may also be smaller than an inclination angle θ3 in the land face 21 located on a side of the tip 3a in the second region 27. Also, an inclination angle of the second region 27 with respect to the first portion 19a may decrease from an end portion on a side of the tip 3a toward an end portion on a side of the rear end 3b in the second region 27.

During penetrating hole processing or countersink processing, burrs may be likely to be generated on a surface of a workpiece that contacts a vicinity of a boundary between the third part 13 and the second part 11. However, when an inclination angle of the land face 21 in the second region 27 in a vicinity of the third part 13 is small, the second region 27 in the vicinity of the third part 13 may have high cutting performance, thus the rotary tool 1 in the non-limiting embodiment can suppress generation of burrs.

Further, to rephrase the above, it can be said that, the inclination angle of the first region 25 with respect to the first portion 19a increases from the end portion on the side of the tip 3a toward the end portion on the side of the rear end 3b in the first region 25, and the inclination angle of the second region 27 with respect to the first portion 19a may increase from the end portion on the side of the rear end 3b toward the end portion on the side of the tip 3a in the second region 27.

Furthermore, when the configuration described above is satisfied, since an inclination angle is large on the side of the rear end 3b of the first region 25 and on the side of the tip 3a of the second region 27, that is, in the center portion of the land face 21, a main cutting portion in the second cutting edge 23 may have excellent defect resistance.

Note that, it may be sufficient that the first region 25 includes a portion in which an inclination angle of the first region 25 with respect to the first portion 19a from a side of the tip 3a toward a side of the rear end 3b decreases, from the end portion on the side of the rear end 3b toward the end portion on the side of the tip 3a in the first region 25. That is, the inclination angle of the first region 25 with respect to the first portion 19a from the side of the rear end 3b to the tip 3a may also partially decrease.

Similarly, it may be sufficient that the second region 27 includes a portion in which an inclination angle of the second region 27 with respect to the first portion 19a from a side of the tip 3a toward a side of the rear end 3b decreases, from the end portion on the side of the tip 3a toward the end portion on the side of the rear end 3b in the second region 27. That is, the inclination angle of the second region 27 with respect to the first portion 19a from the side of the tip 3a to the rear end 3b may also partially decrease.

Also, an inclination angle of the land face 21 with respect to the first portion 19a may be constant, from an end portion on a side of the tip 3a to an end portion on a side of the rear end 3b in the land face 21. When the inclination angle is constant, surface roughness of a finished surface can be made relatively even, and thus a favorable machined surface can be obtained. Note that "the inclination angle is constant" does not mean being constant that is mathematically strict, and may include a slight error that cannot be avoided by manufacturing.

An outer diameter of the first part 9 in the non-limiting embodiment may be set to, for example, from 2 mm to 25 mm. In addition, an outer diameter of the second part 11 in the non-limiting embodiment may be set to, for example, from 4 mm to 50 mm. Further, a size of an outer diameter of the third part 13 may be between the outer diameter of the first part 9 and the outer diameter of the second part 11. Note that, the dimensions described above may be examples, and the rotary tool 1 in the non-limiting embodiment may include dimensions other than those described above.

Examples of a material of the body 3 may include cemented carbide alloy, cermet, or the like. Examples of composition of the cemented carbide alloy may include WC—Co, WC—TiC—Co, and WC—TiC—TaC—Co. Here, WC, TiC, and TaC may be hard particles, and Co may be a binder phase. In addition, the cermet may be a sintered composite material in which a ceramic component is combined with a metal. Specifically, examples of the cermet may include titanium compounds in which one of titanium carbide (TiC) and titanium nitride (TiN) may be a main component.

A surface of the body 3 may be coated with a coating film by using one of a chemical vapor deposition (CVD) method and a physical vapor deposition (PVD) method. Examples of composition of the coating film may include one of titanium carbide (TiC), titanium nitride (TiN), titanium carbonitride (TiCN), alumina ($Al_2O_3$), and the like.

Method for Manufacturing Machined Product

Figure 15:
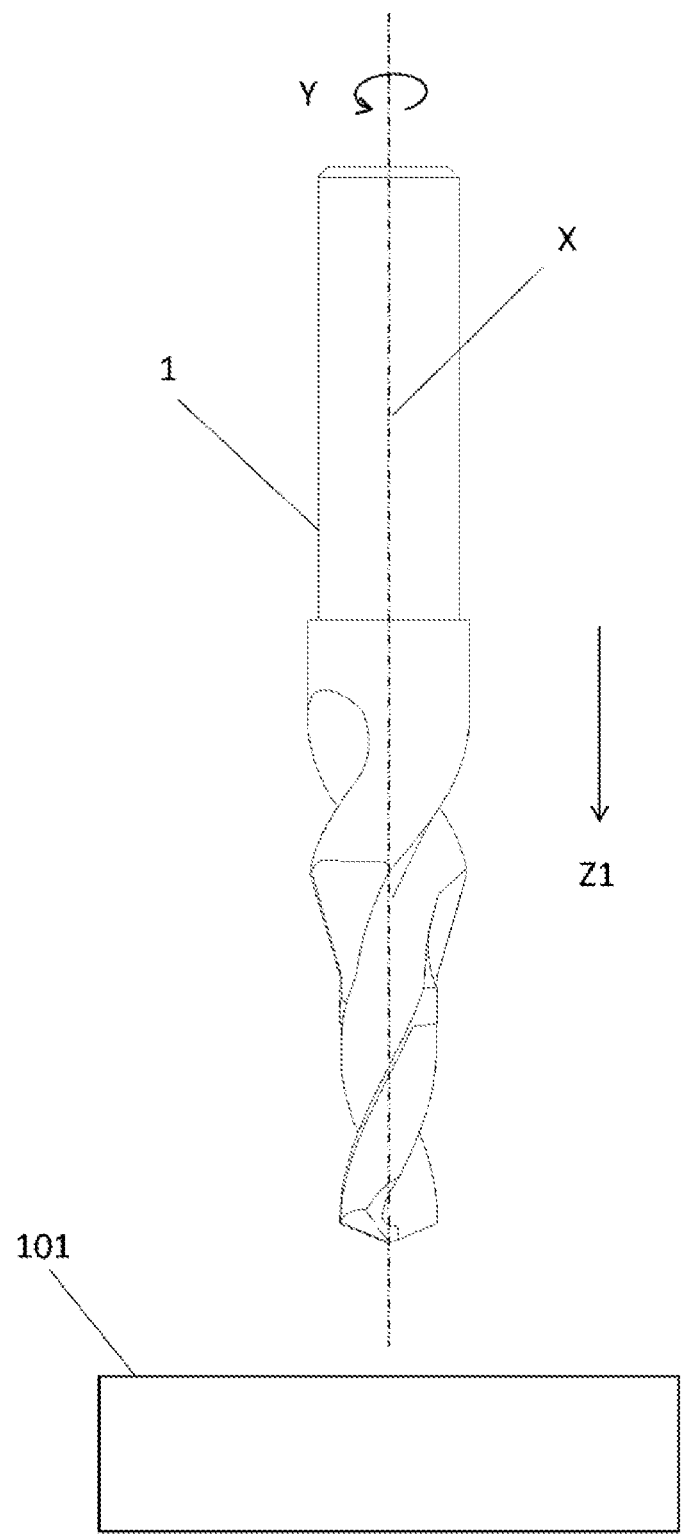
FIG. 15 is a diagram illustrating a step in a method for manufacturing a machined product in the non-limiting embodiment.
Figure 16:
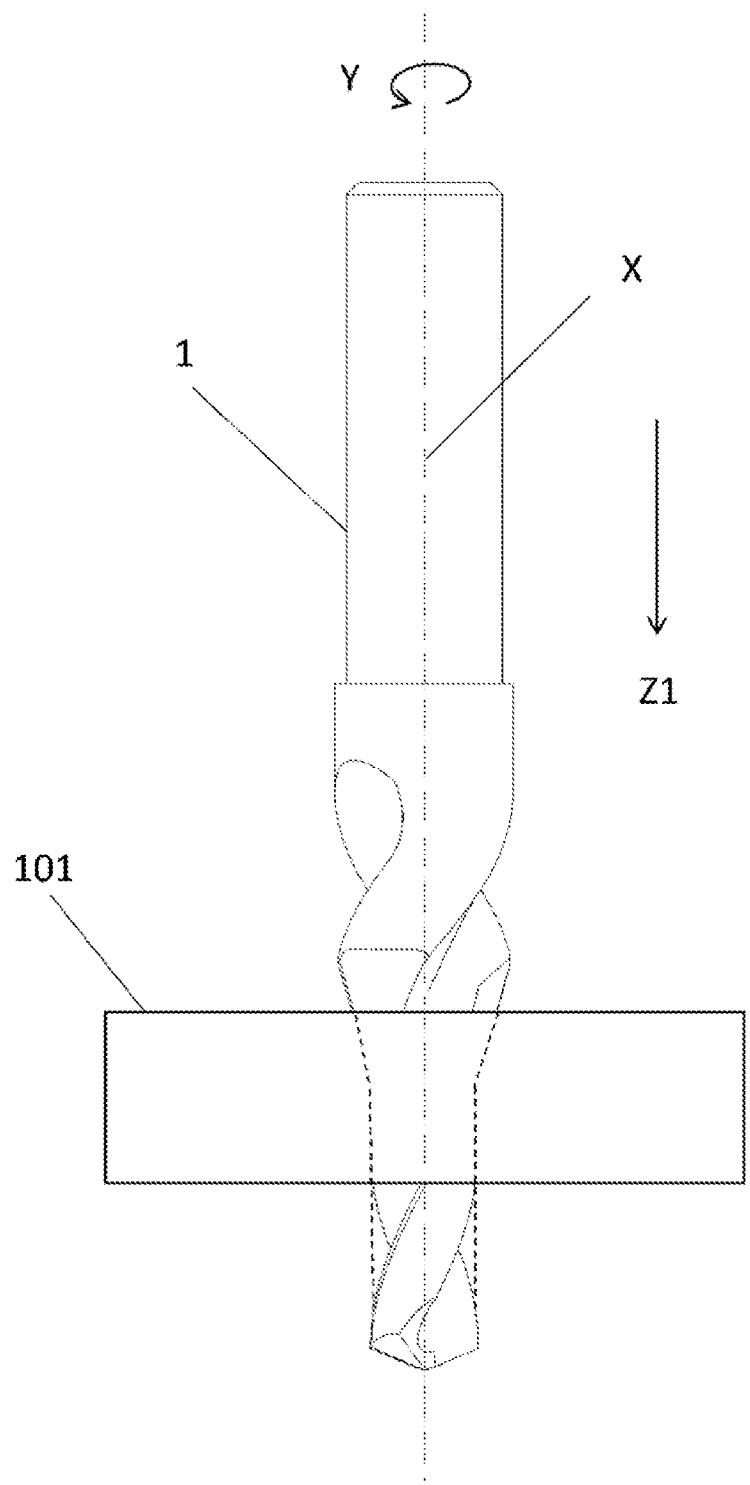
FIG. 16 is a view illustrating a step in the method for manufacturing a machined product according to the non-limiting embodiment.
Figure 17:
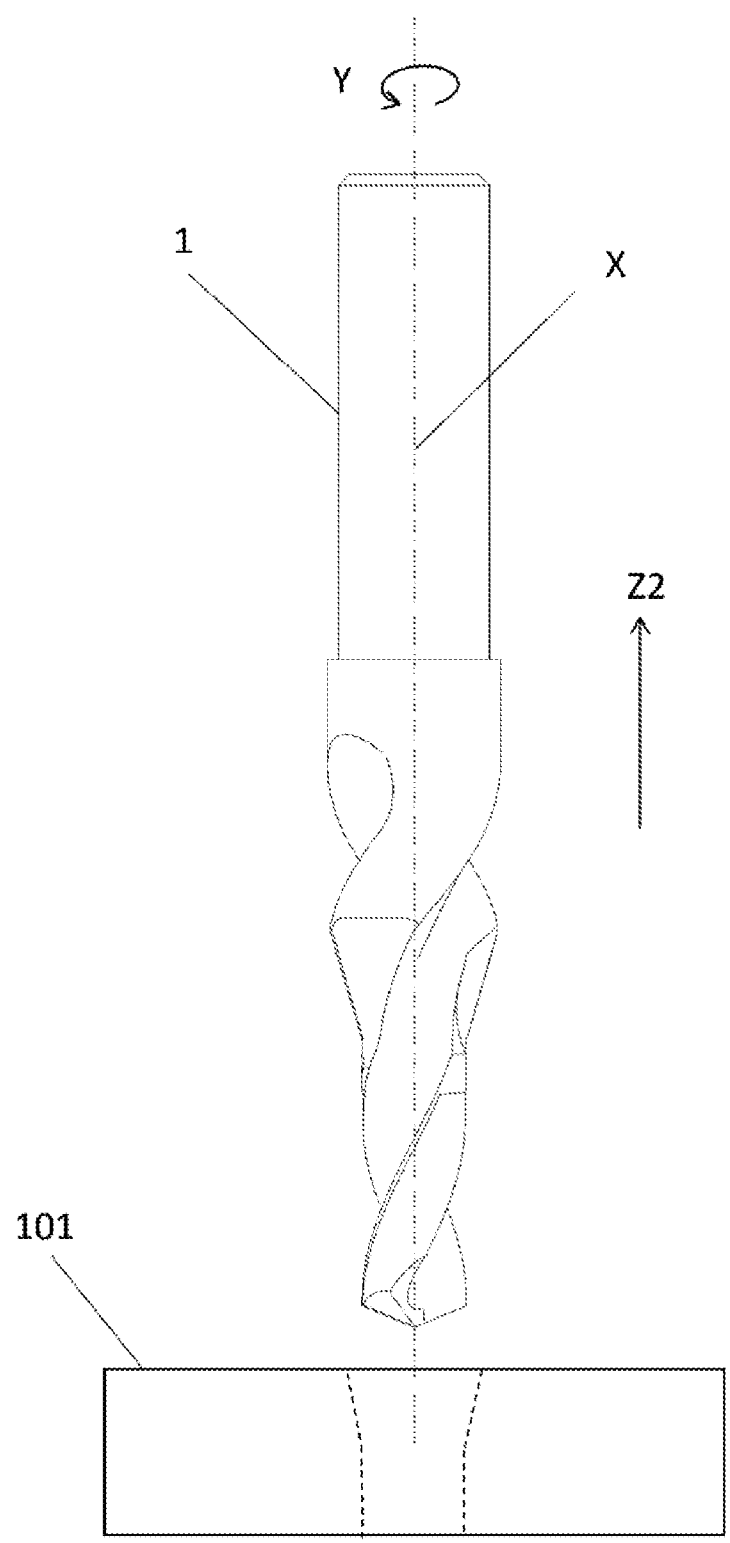
FIG. 17 is a view illustrating a step in the method for manufacturing a machined product according to the non-limiting embodiment.

Now, a method for manufacturing a machined product according to the non-limiting embodiment will be described in detail, as a non-limiting example, taking a case where the rotary tool 1 according to the above-mentioned non-limiting embodiment is used. FIG. 15 to FIG. 17 will be referred to in the following description.

The method for manufacturing a machined product according to the non-limiting embodiment may include (1) a step of rotating, around the rotational axis X, the rotary tool 1 typified by the above-mentioned non-limiting embodiment, (2) a step of bringing a first cutting edge and a second cutting edge of the rotary tool 1 that is rotating into contact with a workpiece 101, and (3) a step of separating the rotary tool 1 from the workpiece 101.

More specifically, first, as illustrated in FIG. 15, by rotating the rotary tool 1 around the rotational axis X while moving the rotary tool 1 in a Z1 direction along the rotational axis X, the rotary tool 1 may be brought relatively closer to the workpiece 101.

Next, as illustrated in FIG. 16, the first cutting edge and the second cutting edge in the rotary tool 1 may be brought into contact with the workpiece 101 to cut the workpiece 101. Then, as illustrated in FIG. 17, by moving the rotary tool 1 in a Z2 direction, the rotary tool 1 may be moved relatively away from the workpiece 101.

In the non-limiting embodiment, the rotary tool 1 may be brought close to the workpiece 101 in a state where the workpiece 101 is fixed and the rotary tool 1 is rotated about the rotational axis X. Moreover, in FIG. 16, the workpiece 101 may be cut by bringing the first cutting edge and the second cutting edge of the rotary tool 1 that is rotating into contact with the workpiece 101. Moreover, in FIG. 17, the rotary tool 1 may be moved away from the workpiece 101 while the rotary tool 1 is rotated.

Note that in the cut processing in the manufacturing method according to the non-limiting embodiment, the rotary tool 1 may be brought into contact with the workpiece 101 or the rotary tool 1 may be moved away from the workpiece 101, by moving the rotary tool 1 in each step. However, as a matter of course, the machining is not limited to such an aspect.

For example, in step (1), the workpiece 101 may be brought close to the rotary tool 1. Similarly, in step (3), the workpiece 101 may be moved away from the rotary tool 1. In a case where the cut processing is to be continued, it may be sufficient that a step is repeated in which, with the rotary tool 1 kept rotating, the cutting edge of the rotary tool 1 is brought into contact with a different part of the workpiece 101.

Typical examples of a material of the workpiece 101 may include aluminum, carbon steel, alloy steel, stainless steel, cast iron, or nonferrous metal.

REFERENCE SIGNS LIST

1 Rotary tool
3 Body
3*a* First end (tip)
3*b* Second end (rear end)
5 Cutting section
7 Shank section
9 First part
11 Second part
13 Third part
15 First cutting edge
17 Flute
19 Outer peripheral surface
19*a* First portion
21 Land face
23 Second cutting edge
25 First region
27 Second region
29 Main flute
31 Sub flute
33 First surface
35 Second surface
37 Third cutting edge
39 Fourth cutting edge
101 Workpiece
L Boundary
X Rotational axis
Y Rotational direction
Z Cutting direction

The invention claimed is:

1. A rotary tool, comprising:
a body with a rod shape extending along a rotational axis from a first end toward a second end, and comprising
a first part including the first end and having a first outer diameter,
a second part located closer to the second end than the first part and having a second outer diameter larger than the first outer diameter,
a third part located between the first part and the second part, and having a third outer diameter that increases from a side of the first part toward a side of the second part,
a first cutting edge located at the first end,
a flute extending from the first cutting edge toward the second end, and located at the first part, the third part, and the second part, and
an outer peripheral surface located along the flute at the first part, the third part, and the second part, wherein
the outer peripheral surface is located rearward the flute in a rotational direction of the rotational axis,
the outer peripheral surface in the third part comprises a first portion,
the third part comprises
a land face located between the flute and the first portion, and
a second cutting edge located on a first ridge line where the first portion and the land face intersect,
the land face comprises
a first region, in which a width in a direction orthogonal to a second ridge line formed by the flute and the land face increases from a side of the first end toward a side of the second end, and
a second region located closer to the second end than the first region, in which a width in a direction orthogonal to the second ridge line decreases from a side of the first end toward a side of the second end.

2. The rotary tool according to claim 1, wherein the land face is separated from the first part and the second part.

3. The rotary tool according to claim 1, wherein the flute comprises a main flute having a helical shape and located from the first part to the second part, and a sub flute located between the main flute and the outer peripheral surface.

4. The rotary tool according to claim 3, wherein the sub flute comprises
a first surface located along the second ridge line, and
a second surface located forward the first surface in the rotation direction, and adjacent to the first surface, and the second surface is a convex curved shape.

5. The rotary tool according to claim 3, wherein the sub flute comprises
a first surface located along the second ridge line, and a second surface located forward the first surface in the rotation direction, and adjacent to the first surface, and the second surface comprises a portion in which a distance from the rotational axis decreases from a side of the first end toward the second end.

6. The rotary tool according to claim 3, wherein the sub flute comprises
a first surface located along the second ridge line, and a second surface located forward the first surface in the rotation direction, and adjacent to the first surface, and the first surface comprises a portion in which a width in a direction orthogonal to the ridge line increases from a side of the first end toward the second end.

7. The rotary tool according to claim 1, wherein an inclination angle of the land face with respect to the outer peripheral surface is constant from an end portion on a side of the first end to an end portion on a side of the second end in the land face.

8. The rotary tool according to claim 1, wherein an inclination angle of the first region with respect to the outer peripheral surface decreases from an end portion on a side of the second end toward an end portion on a side of the first end in the first region.

9. A method for manufacturing a machined product, comprising:
rotating the rotary tool according to claim 1;
bringing the rotary tool that is rotating into contact with a workpiece; and
separating the rotary tool from the workpiece.

* * * * *